United States Patent
Narula

(10) Patent No.: US 11,516,586 B2
(45) Date of Patent: Nov. 29, 2022

(54) CONTEXTUAL LATENCY CONFIGURATION FOR ISOCHRONOUS AUDIO TRANSPORT

(71) Applicant: Dell Products L.P., Round Rock, TX (US)

(72) Inventor: Harpreet Narula, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/156,812

(22) Filed: Jan. 25, 2021

(65) Prior Publication Data

US 2022/0240017 A1    Jul. 28, 2022

(51) Int. Cl.
| | |
|---|---|
| *H04R 3/12* | (2006.01) |
| *H04R 5/04* | (2006.01) |
| *H04L 65/80* | (2022.01) |
| *H04L 65/65* | (2022.01) |

(52) U.S. Cl.
CPC ............ *H04R 5/04* (2013.01); *H04L 65/65* (2022.05); *H04L 65/80* (2013.01); *H04R 3/12* (2013.01); *H04R 2420/07* (2013.01)

(58) Field of Classification Search
CPC .............. H04R 5/04; H04R 3/12; H04L 29/06
USPC ......................................................... 700/94
See application file for complete search history.

(56) References Cited

U.S. PATENT DOCUMENTS

2019/0045304 A1*  2/2019  Bhalla ...................... H04R 3/12
2021/0224024 A1*  7/2021  Chen ......................... H04R 3/00

FOREIGN PATENT DOCUMENTS

WO   WO-2020133183 A1 *  7/2020
WO   WO-2020239985 A1 * 12/2020 ............. H04L 65/60

\* cited by examiner

*Primary Examiner* — Melur Ramakrishnaiah
(74) *Attorney, Agent, or Firm* — Jackson Walker L.L.P.

(57) ABSTRACT

An audio configuration method establishes an audio connection between an audio source and multiple audio sinks and determines an audio context of an audio application generating audio content. The audio connection includes multiple components of latency and at least one latency component is configured based on the audio context. The transport may include a group of synchronized isochronous streams and may be associated with a transport latency indicative of time required to deliver packets to the audio sinks and a presentation latency indicative of time required for the audio sinks to render packets. The transport latency may reflect a flush timeout parameter used to extend the lifetime of a packet in exchange for longer transport delay. The flush timeout parameter may be configured in accordance with an audio context of the audio application. Applications with low latency tolerance might perform better with a lower flush timeout and vice versa.

20 Claims, 3 Drawing Sheets

CONTEXTUAL LATENCY CONFIGURATION FOR ISOCHRONOUS AUDIO TRANSPORT

TECHNICAL FIELD

The present disclosure relates to audio devices such as headsets and ear buds, and, more specifically, audio devices used in a variety of different audio contexts.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Headsets and other audio devices are a frequently included among the resources of an information handling system. Audio devices may be used, as non-limiting examples, to participate in conference calls and distanced collaboration sessions, play interactive online games, and stream audio content, each of which has different audio latency tolerances. Historically, headsets and other audio devices may have been preconfigured for optimal performance within a particular latency context. Thus, the desirable convenience, economy, and simplicity of a single headset has generally come at the price of varying and inconsistent audio performance across different applications while users who wished to optimize their audio experience across the audio context spectrum may have been required to acquire and have ready multiple audio devices.

SUMMARY

In accordance with the teachings of the present disclosure, problems associated with reconciling the different latency characteristics of different types of audio applications with the desire to use a single audio device are addressed by implementing functionality to configure the audio transport based on an audio context of the active application.

In accordance with subject matter disclosed herein, an audio configuration method includes establishing, in accordance with an audio transport, an audio connection between an audio source and two or more audio sinks, where an audio source refers to a resource that generates and transmits audio content and an audio sink refers to a resource that receives and renders audio content.

Disclosed audio configuration methods may determine an audio context of an active audible output application, wherein an audible output application refers to any application in which the generation of audio content is a primary or highly significant objective and function and an active audible output application refers to an audible output application that is communicating content to at least one, but typically two or more audio sinks via the audio transport. For the sake of brevity and clarity, an audible output application may be referred to herein as simply an application.

In at least one embodiment, the audio transport has a design, structure, architecture, or format that encompasses two or more distinct components of the transport's overall latency, and one or more audio configuration methods in accordance with the present invention monitor, modify, adjust, and/or otherwise configure at least one of the latency components based, at least in part, on the audio context of an active audible output application. Applications with high latency tolerance may be suitable for an audio transport configuration emphasizing higher quality by extending the time that audio packets from the source might remain in-flight or unacknowledged before expiring. Applications with lower latency tolerance may motivate an audio transport configuration with a shorter deadline for terminating unacknowledged packets.

The audio transport may define, support, or and include a group of two or more time-synchronized, isochronous streams wherein each isochronous stream in the group is associated with a corresponding audio sink. In at least some embodiments, the audio transport may be an LE Audio transport or possess characteristics of and support functionality analogous to an LE Audio transport. For purposes of this disclosure, LE Audio refers a set of Bluetooth specifications identified by the Bluetooth SIG as the defining specifications for LE Audio. At the time of writing, these specifications included the Bluetooth Core Specification v5.2; Core Specification Supplement v9; LC3: Low Complexity Communications Codec v1.0; as well as audio framework profiles and services and higher level use case profiles, all of which are incorporated by reference herein. LE Audio introduces isochronous channels to transfer time-bound between devices and ensures that multiple sink devices receiving audio packets from the same source will render it at the same time. Isochronous channels under LE Audio impose a time-limited data validity and expired packets will be discarded.

In an exemplary use case, the audio sinks that receive audio packets from the source represent the left and right speakers of an audio headset or similar device and, in this use case, the audio transport may include two time-synchronized and isochronous streams, one for the left speaker and the other for the right speaker, and these two streams may be referred to as an isochronous group. Within the group, a schedule of transmission and receiver time slots, referred to as events and subevents, exists for each stream and all streams in the group share common timing reference data.

Latency components of the audio transport may include a transport latency and a presentation latency. The transport latency may refer to an interval of time allotted to deliver an audio packet from the audio source to each audio sink. The presentation latency may refer to an interval of time allotted for the audio sinks to render an audio packet after it has been received.

Transport latency may be defined by one or more timing parameters associated with the audio transport. Each isochronous stream may include a sequence of event intervals.

Each event interval may include one or more subevents, where the audio source transmits once during each subevent and the audio sink associated with the isochronous stream responds, assuming it is able to do so. In embodiments that implement the LE Audio transport, the event interval for an isochronous stream can be calculated based on other parameters associated with the transport, such as a subevent interval, the number of subevents per event, and a flush timeout parameter.

Configuration of the transport latency may include determining a value for the flush timeout parameter based, at least in part, on the audio context of the audible output application. Determining the audio context of an audible output application may include assigning a latency level to the audible output application based on a type of the audible output application. The type of the audible output application may be selected from a preferably, but not necessarily, small group of application types.

Exemplary types of audible output applications, and their corresponding latency contexts might include: gaming type applications which may be characterized as having a low latency context, conference call type applications which may be characterized as having an intermediate latency context, and streaming audio type applications, which may be characterized as have a high latency context. Thus, in this example, determining a latency level for an audible output application might include assigning a comparatively low latency level to gaming type applications, assigning a comparatively high latency level to streaming audio type applications, and assigning an intermediate latency level to conference call type applications.

In at least some embodiments, a flush timeout parameter of the audio transport may be adjusted in accordance with the latency level of an active audible output application. In such embodiments, determining a value for the flush timeout parameter may include assigning a higher value to the flush timeout parameter for a high latency level application and assigning a lower value of the flush timeout parameter to a low latency level application. Higher values of the flush timeout parameter would increase the transport latency but would also result in a higher quality connection because by having a longer interval to successively transmit any packet that was not dropped packets would have a longer interval to successively transmit any packets that were not acknowledged when first transmitted.

In another embodiment, instead of or in addition to configuring the transport latency in view of the transport latency, the presentation latency may be optimized or otherwise configured based on the audio context. Optimizing the presentation latency might be performed in accordance with digital signal processing capabilities and requirements of the headset and the audio application. In some embodiments, the audio source and the audio sinks may determine these capabilities and requirements as part of a handshake performed, for example, when the audio application is installed, when the application is invoked, and so forth. The handshake might be implemented in accordance with a proprietary and/or cooperative effort between the audio source maker, the headset maker, and/or the application developer.

Technical advantages of the present disclosure may be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network data storage device, or any other suitable device and may vary in size, shape, performance, functionality, and price. The information handling system may include memory, one or more processing resources such as a central processing unit (CPU) or hardware or software control logic. Additional components of the information handling system may include one or more data storage devices, one or more communications ports for communicating with external devices as well as various input and output (I/O) devices, such as a keyboard, a mouse, and a video display. The information handling system may also include one or more buses operable to transmit communication between the various hardware components.

In this disclosure, the term "information handling resource" may broadly refer to any component system, device or apparatus of an information handling system, including without limitation processors, buses, memories, input-output devices and/or interfaces, storage resources, network interfaces, motherboards, electro-mechanical devices (e.g., fans), displays, and power supplies.

Figure 1:
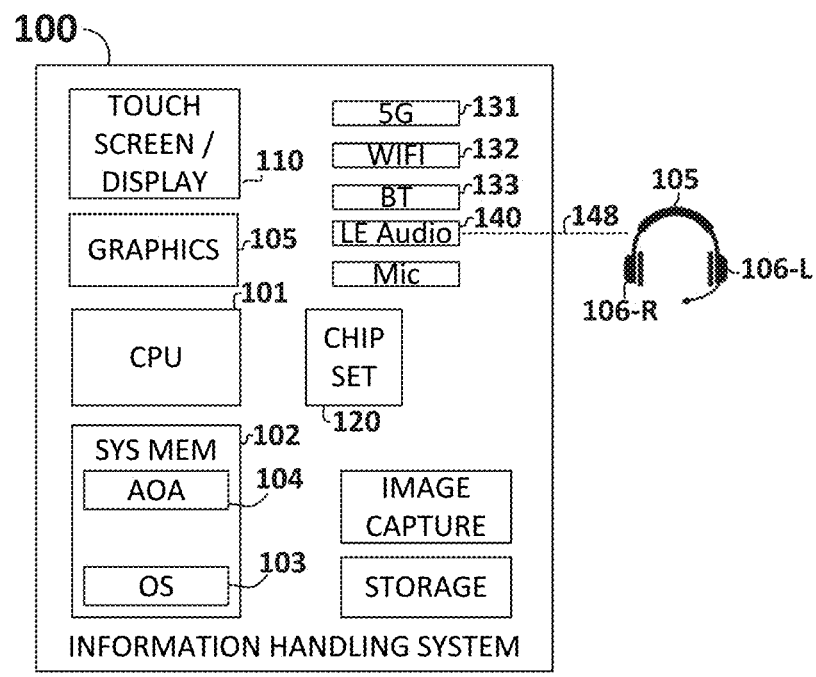
FIG. 1 illustrates a block diagram of an information handling system.

Referring now to the drawings, FIG. 1 illustrates elements of an information handling system 100 suitable for performing latency-aware configuration of an audio transport between the information handling system as the source of audio content and at least one, but typically two or more audio sinks, such as the left and right speakers of a headset, ear bud pair, or another comparable audible output device. The information handling system 100 illustrated in FIG. 1 includes elements that may be associated with a mobile device such as a smart phone, tablet device or the like. However, disclosed features for configuring an audio transport may be beneficially included in other types of devices and those of ordinary skill in the field of electronic devices will readily appreciate that the depicted system is exemplary and that other devices not explicitly illustrated herein, including desktop and laptop computers, may incorporate audio transport configuration features disclosed herein. It will be further appreciated that, for the sake of clarity and brevity, many elements and components of information handling system 100 have been omitted from the depiction in FIG. 1.

The information handling system 100 illustrated in FIG. 1 includes a general purpose processor or central processing unit (CPU) 101 communicatively coupled to various peripheral devices generically referred to herein as information handling resources. The information handling resources illustrated in FIG. 1 include a system memory 102 suitable for storing data (not explicitly depicted in FIG. 1) intended for and/or generated by CPU 101 as well as computer executable instructions, sometimes referred to as programs, applications, and the like, for performing specific tasks and functions.

For the sake of simplicity, FIG. 1 illustrates only two programs stored in system memory 102, but it will be readily appreciated that other programs may be stored in system memory 102. An operating system 103 manages the identification and allocation of system resources and provides a functional platform for CPU 101 to execute application programs including, as a non-limiting example, an audible output application (AOA) 104. As its name suggests, AOA application 104 encompasses any application that generates audible content as a primary or highly significant function or objective. Examples of AOA applications include streaming audio applications, gaming applications, and collaboration and conferencing applications.

The information handling system of FIG. 1 further includes a chipset 120 to communicatively couple various peripheral devices to CPU 101. The peripheral devices coupled to CPU 101 via chipset 120 include various wireless transceiver resources supporting various wireless communication transports and protocols. The wireless transceiver resources illustrated in FIG. 1 include a 5G module 131 for broadband cellular communication, a WiFi module 132 for wireless local area network communication, and a legacy or classic Bluetooth module 133 for communicating with peripheral devices in close proximity, and an LE Audio module 140 described in more detail below. The LE Audio module 140 is illustrated in FIG. 1 communicatively coupled to a headset 145 over an LE Audio connection 148.

In at least some implementations, LE Audio connections enable an audio source to send audio packets to two or more audio sinks such that the packets are rendered at the same time by each of the audio sinks. As depicted in FIG. 1, information handling system 100 and, more specifically, AOA application 104 in combination with LE Audio module 140, serve as an audio source while the left ear piece 106-L and right ear piece 106-R of headset 105 function as audio sinks.

Figure 2:
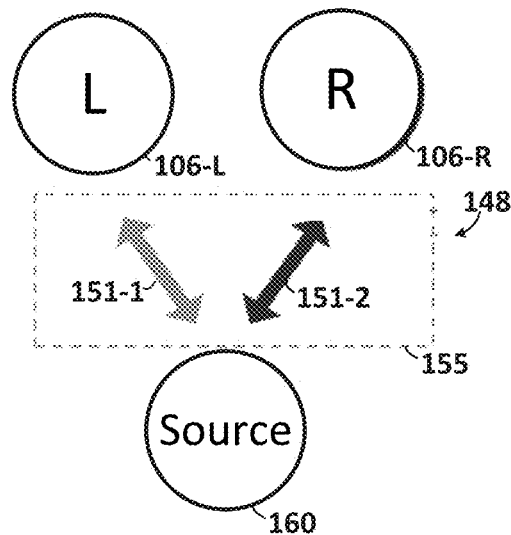
FIG. 2 illustrates aspect of an audio transport established between an audio source and multiple audio sinks.

Referring now to FIG. 2, additional detail of the LE Audio connection 148 of FIG. 1 is illustrated. FIG. 2 illustrates an LE Audio connection 148 established between an audio source 160 and two audio sinks corresponding to left ear piece 106-L and right ear piece 106-R. Audio source 160 represents a combination of CPU 101, AOA application 104, LE Audio module (FIG. 1) and other, elements or components (not depicted in FIG. 1) of information handling system 100 that function to generate audio packets for delivery to headset 105.

FIG. 2 indicates that LE Audio connection 148 includes two audio content streams, a first stream 151-1 associated with left ear piece 106-L and a second stream 151-2 associated with right ear piece 106-R. In addition, FIG. 2 emphasizes that the two content streams 151 are part of a content stream group 155. In at least some embodiments, one significant characteristic of a content stream group is a common timing reference shared by each of the streams included in the group. Thus, in FIG. 2, because first stream 151-1 and second stream 151-2 are part of content stream group 155, first stream 151-1 and second stream 151-2 share a common timing reference that facilitates synchronization of the two streams. In addition, because the individual content streams supported by LE Audio are, in at least some instances, isochronous streams in which the interval between successive events is an integer multiple of a fixed time interval, content streams 151-1 and 151-2 may be referred to as isochronous streams and content stream group 155 may be referred to as an isochronous group.

Significantly, for purposes of enabling or performing latency-aware configuration of an audio transport, LE Audio defines a schedule of transmission and receiver time slots, referred to as events and subevents, for each isochronous stream in an isochronous group. This schedule is influenced by one or more parameters that may be increased or decreased as desired.

Figure 3:
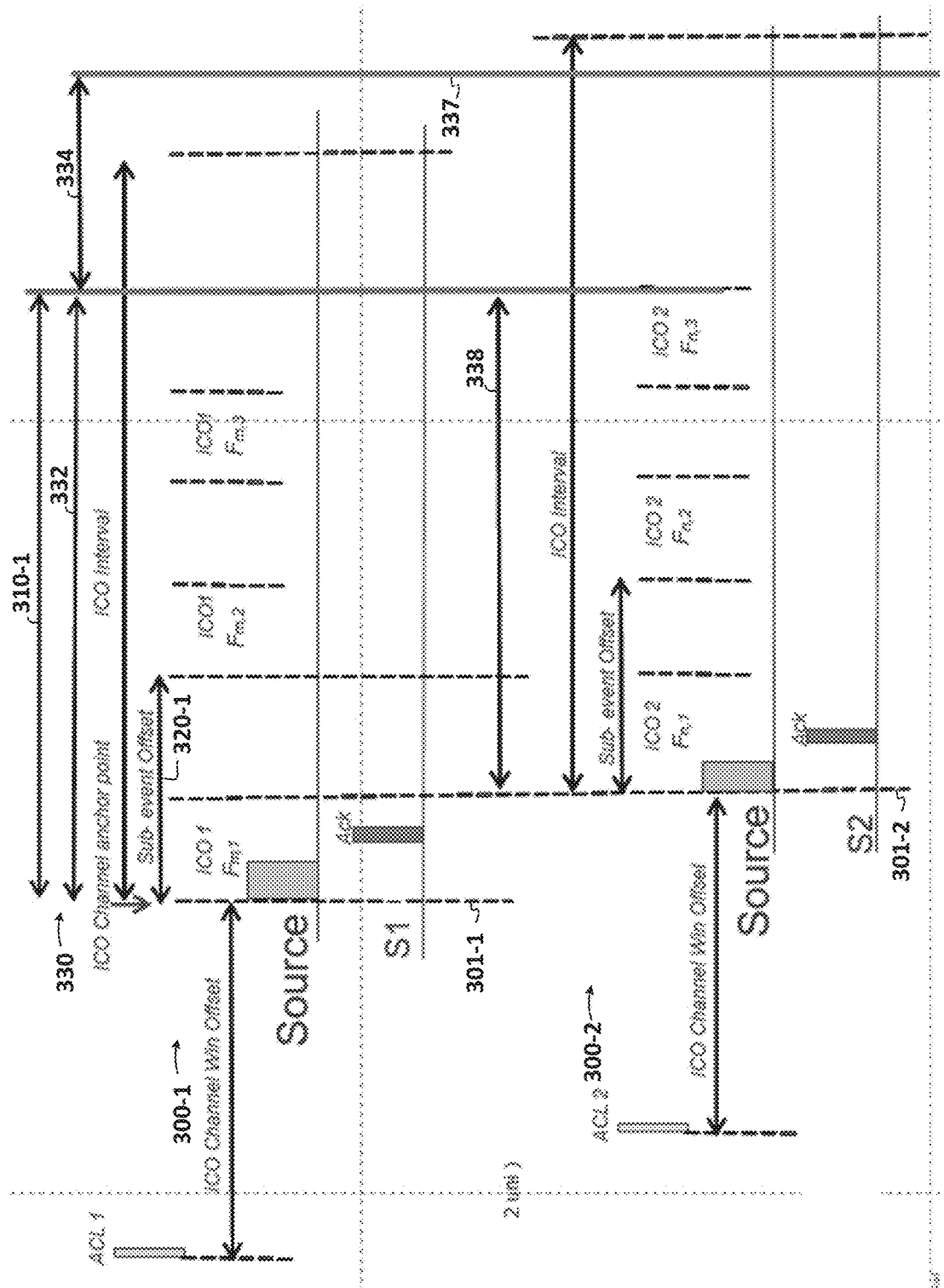
FIG. 3 illustrates a timing diagram of the audio transport.

Referring now to FIG. 3, timing diagrams for an exemplary communication transport associated with the LE Audio connection 148 are illustrated. The timing diagrams illustrated in FIG. 3 include a first timing diagram 300-1 for a first isochronous channel (ICO) that supports the first stream 151-1 of FIG. 2 and a second timing diagram 300-2 for a second ICO that supports the second stream 151-2 of FIG. 2.

Each ICO specifies the timing of the first packet, which provides an anchor point 301 for the timing of subsequent packets. The illustrated transport defines time slots for events 310, each of which includes one or more time slots for subevents 320. The duration of event 310 is determined by the subevent duration, also referred to herein as the subevent offset (SubOff) and the number of subevents per event (NPE). The exemplary timing diagram of FIG. 3 includes three subevents (Fm, Fm+1, Fm+2) per event and therefore the duration of an event is 3*SubOff.

FIG. 3 illustrates interleaving of activity in the first ICO witch activity in the second ICO such that the second channel processes a first packet before the first channel processes a second channel. In this configuration the subevent offset, Suboff, has sufficient duration to process a packet for ICO 1 in the first half of the subevent interval and a packet for ICO 2 during a second half of the interval.

FIG. 3 illustrates latency parameters associated with the transport. Specifically, the cumulative or overall latency 330 of the transport includes two primary components, transport delay 332 and presentation delay 334. Mathematically, the transport's latency is given by $$\text{Latency} = D_T + D_P$$

where $D_T$ is the transport delay (maximum time to deliver a packet to all sinks and $D_P$ is the presentation delay (delay to account for time to render packets, including codec processing, D/A conversion, frame buffer delays, clock differences, etc.).

LE Audio supports a flush timeout parameter that extends the packet expiration interval beyond the end of the current event interval. This can be seen in FIG. 4, where the audio sink 401 is unable to acknowledge packet 1 transmitted by audio source 402 during any of the three subevent intervals 407 in the first event interval 408. In the absence of a flush timeout parameter capable of extending the expiration time for packet 1, packet 1 would be discarded at the end 410 of the first event interval.

Figure 4:
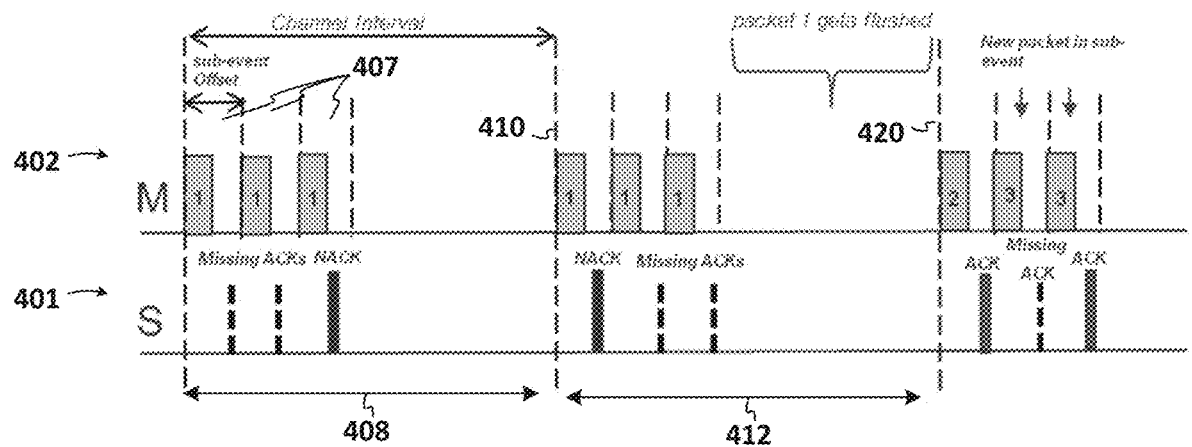
FIG. 4 illustrates audio packet timing in accordance with the audio transport.
Figure 5:
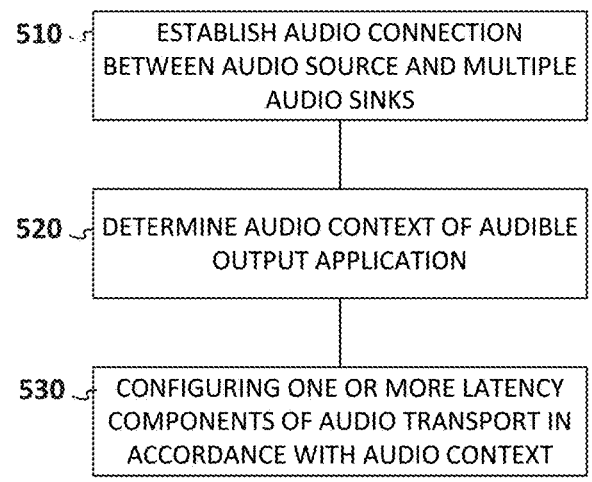
FIG. 5 illustrates a flow diagram method of a method for configuring an audio transport based on a latency context of an audio application.

As seen in FIG. 4, however, the audio source 402 continues to transmit packet 1 during the second event interval 412. In the illustrated example, however, the audio sink 401 continues to respond with a NACK or to not respond at all. When the end 420 of the second event interval 412 arrives with packet 1 still not yet acknowledge, the packet is discarded.

In this example, a flush timeout (FT) value of 2 indicates that the expiration deadline for packets transmitted during a subevent within event interval N is the end of event interval N+(FT−1).

Returning to FIG. 4 and taking the flush timeout parameter into account, the transport delay is given as:

$$D_T = (SubOff*NSE) + I_c*(FT-1)$$

where SubOff=Subevent interval; NSE=No. of Subevents per Event; $I_c$=channel interval and FT=flush timeout Thus, the transport delay can be adjusted by changing the value of the flush timeout parameter (FT). As discussed previously and as now illustrated in FIG. 5, the information handling system, after establishing (block 510) an audio connection between the audio source and two or more audio sinks, may determine (block 520) an audio or latency context of an audible output application. The information handling system or a user of the information handling system may then configure (block 530) one or more latency components of the audio transport in accordance with the previously determined audio context. In this particular example, the configuration in block 530 comprises changing the value of the FT parameter. During audible output applications with low latency tolerance, FT can be set to 1 or otherwise reduced from a current values. During applications with high latency tolerance, FT can be increased to improve quality of the delivered content by eliminating or reducing dropped packets.

Returning to FIG. 3, configuration of latency components may include minimizing or optimizing the presentation delay 334 in accordance with the following equations $$t_P = D_{C(n)} + D_P$$

where $t_P$=the time point (337) when presentation should begin and $$D_{C(n)} = D_T - ((n-1)*SubOff)$$

where $D_{C(n)}$=Channel (n) delay (338)=delay from anchor point of first channel to anchor point of channel (n)

Although the present disclosure has been described in detail, it should be understood that various changes, substitutions, and alterations can be made hereto without departing from the spirit and the scope of the disclosure as defined by the appended claims.

What is claimed is:

1. An audio configuration method, wherein the method comprises:
   establishing, in accordance with a wireless audio transport, a wireless audio connection between an audio source and two or more audio sinks;
   determining an audio context of an audible output application executing on the audio source, wherein the audible output application communicates audio content to the audio sinks via the wireless transport and wherein the audio context corresponds to a latency tolerance of the audible output application;
   configuring at least one of two or more latency components of the audio transport based, at least in part, on the audio context.

2. The audio configuration method of claim 1, wherein the wireless audio connection comprises a group of two or more time-synchronized isochronous streams wherein each isochronous stream in the group is associated with a corresponding audio sink.

3. The audio configuration method of claim 2, wherein the two or more audio sinks include:
   a first audio sink corresponding to a first speaker of an audio device; and
   a second audio sink corresponding to a second speaker of the audio device.

4. The audio configuration method of claim 3, wherein the audio device comprises a headset and wherein the first speaker comprises a left speaker of the headset and the second speaker comprises a right speaker of the headset.

5. The audio configuration method of claim 2, wherein the two or more latency components include:
   a transport latency indicative of a maximum interval required to deliver the packet to each of the audio sinks; and
   a presentation latency indicative of a maximum interval for each of the audio sinks to render the packet.

6. The audio configuration method of claim 5, wherein transport latency is indicative of an event interval, wherein the event interval includes one or more subevent intervals and each subevent interval includes:
   one transmission from the audio source to one of the audio sinks; and
   a response from the audio sink.

7. The audio configuration method of claim 6, wherein the event interval is determined in accordance with a subevent offset, a number of sub events per event interval, and a flush timeout parameter, wherein configuring at least one of two or more latency components comprises determining the flush timeout parameter based, at least in part, on the audio context.

8. The audio configuration method of claim 2, wherein determining the audio context comprises assigning a latency level to the audible output application based on a type of the audible output application.

9. The audio configuration method of claim 8, wherein the type of the audible output application is selected from the group comprising: a gaming type, a conference call type, and a streaming audio type and wherein assigning the latency level includes assigning a low latency level to gaming type applications, assigning a high latency level to streaming audio type applications, and assigning an intermediate latency level to conference call type applications.

10. The audio configuration method of claim 9, further comprising, determining a higher flush timeout parameter for a high latency level application and assigning a lower flush timeout parameter to a low latency level application.

11. The audio configuration method of claim 5, wherein configuring at least one of the two or more latency components comprises optimizing the latency component in accordance with digital signal processing capabilities and requirements of the headset and the audio context, wherein said optimizing by a handshake communication between the audio source and the headset.

12. An information handling system, comprising:
   an audio source device to execute an audio application program to generate audio content, wherein the audio source device includes is configured to perform configuration operations including:
      establishing, in accordance with a wireless audio transport, a wireless audio connection between an audio source and two or more audio sinks;
      determining an audio context of an audible output application executing on the audio source, wherein the audible output application communicates audio content to the audio sinks via the wireless transport and wherein the audio context corresponds to a latency tolerance of the audible output application; and configuring at least one of two or more latency components of the audio transport based, at least in part, on the audio context.

13. The information handling system of claim 12, wherein the wireless audio connection comprises a group of two or more time-synchronized isochronous streams wherein each isochronous stream in the group is associated with a corresponding audio sink.

14. The information handling system of claim 13, wherein the two or more audio sinks include:
a first audio sink corresponding to a first speaker of an audio device; and
a second audio sink corresponding to a second speaker of the audio device.

15. The information handling system of claim 14, wherein the audio device comprises a headset and wherein the first speaker comprises a left speaker of the headset and the second speaker comprises a right speaker of the headset.

16. The information handling system of claim 12, wherein the two or more latency components include:
a transport latency indicative of a maximum interval required to deliver the packet to each of the audio sinks; and
a presentation latency indicative of a maximum interval for each of the audio sinks to render the packet.

17. The information handling system of claim 16, wherein transport latency is indicative of an event interval, wherein the event interval includes one or more subevent intervals and each subevent interval includes:
one transmission from the audio source to one of the audio sinks; and
a response from the audio sink.

18. The information handling system of claim 17, wherein the event interval is determined in accordance with a subevent offset, a number of sub events per event interval, and a flush timeout parameter, wherein configuring at least one of two or more latency components comprises determining the flush timeout parameter based, at least in part, on the audio context.

19. The information handling system of claim 18, wherein determining the audio context comprises:
assigning a low latency level to gaming type applications, assigning a high latency level to streaming audio type applications, and assigning an intermediate latency level to conference call type applications; and
assigning a low value to the flush timeout parameter for low latency level applications, assigning a high value to the flush timeout parameter for high latency level applications, and assigning an intermediate value to the flush timeout parameter for intermediate latency level applications.

20. The information handling system of claim 16, wherein configuring at least one of the two or more latency components comprises optimizing the latency component in accordance with digital signal processing capabilities and requirements of the headset and the audio context, wherein said optimizing by a handshake communication between the audio source and the headset.

* * * * *